United States Patent
Winer

(10) Patent No.: US 10,970,481 B2
(45) Date of Patent: Apr. 6, 2021

(54) INTELLIGENTLY DELETING BACK TO A TYPOGRAPHICAL ERROR

(71) Applicant: Apple Inc., Cupertino, CA (US)

(72) Inventor: Morgan H. Winer, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/636,131

(22) Filed: Jun. 28, 2017

(65) Prior Publication Data

US 2019/0005017 A1    Jan. 3, 2019

(51) Int. Cl.
G06F 17/00 (2019.01)
G06F 40/232 (2020.01)
G06F 40/242 (2020.01)

(52) U.S. Cl.
CPC .......... G06F 40/232 (2020.01); G06F 40/242 (2020.01)

(58) Field of Classification Search
CPC ...... G06F 17/27; G06F 17/257; G06F 17/273; G06F 17/2735; G06F 40/232; G06F 40/242; G06K 9/00
USPC ....................................................... 715/257
See application file for complete search history.

(56) References Cited

U.S. PATENT DOCUMENTS

| | | | | |
|---|---|---|---|---|
| 4,797,855 A * | 1/1989 | Duncan, IV | .......... | G06F 40/232 715/236 |
| 4,807,181 A * | 2/1989 | Duncan, IV | .......... | G06F 40/232 715/236 |
| 4,907,900 A * | 3/1990 | Duncan, IV | .......... | G06F 40/232 400/63 |
| 4,915,546 A * | 4/1990 | Kobayashi | ............ | G06F 40/232 400/697 |
| 5,013,167 A * | 5/1991 | Ervin | ..................... | G06F 40/232 400/63 |
| 5,572,423 A * | 11/1996 | Church | .................. | G06F 40/232 715/257 |
| 6,310,971 B1 * | 10/2001 | Shiiyama | .......... | G06F 17/30985 382/181 |
| 6,424,983 B1 * | 7/2002 | Schabes | ................ | G06F 40/232 715/257 |
| 7,155,671 B1 * | 12/2006 | Kim | ...................... | G06F 40/232 715/202 |
| 8,612,213 B1 * | 12/2013 | Zhai | ........................ | G06F 17/24 704/251 |
| 8,701,032 B1 * | 4/2014 | Zhai | .................... | G06F 3/04886 715/773 |
| 9,678,664 B2 * | 6/2017 | Zhai | ....................... | G06F 3/0219 |
| 2007/0188472 A1 * | 8/2007 | Ghassabian | .............. | B41J 3/445 345/169 |
| 2013/0283156 A1 * | 10/2013 | Al Badrashiny | ..... | G06F 40/232 715/257 |

(Continued)

OTHER PUBLICATIONS

Creative Commons Attribution—Share Alike 3.0 http://creativecommons.org/licenses/by-sa/3.0 (Year: 2013).*

*Primary Examiner* — Mohammed H Zuberi

(74) *Attorney, Agent, or Firm* — Invoke

(57) ABSTRACT

Disclosed herein are methods and systems that allows a user, when entering a string of input characters, to remove multiples input characters at one time back to where a typographical error occurs in the string. The method offers improvement over the current character-by-character deletion method where a user hits a deletion key multiple times to remove input characters that include the typographical error.

19 Claims, 9 Drawing Sheets

(56) References Cited

U.S. PATENT DOCUMENTS

| | | | |
|---|---|---|---|
| 2013/0285927 A1* | 10/2013 | Pasquero | G06F 3/04883 345/173 |
| 2013/0325438 A1* | 12/2013 | Griffin | G06F 40/232 704/9 |
| 2014/0115519 A1* | 4/2014 | Ouyang | G06F 3/04886 715/773 |
| 2014/0143665 A1* | 5/2014 | Hauser | G06F 17/273 715/259 |
| 2014/0281943 A1* | 9/2014 | Prilepov | G06F 40/242 715/257 |
| 2015/0268854 A1* | 9/2015 | Kim | G06F 3/04886 715/773 |
| 2016/0132471 A1* | 5/2016 | Kim | G06F 17/273 715/257 |

* cited by examiner

INTELLIGENTLY DELETING BACK TO A TYPOGRAPHICAL ERROR

TECHNICAL FIELD

The disclosure generally relates to processing of input characters to identify possible input errors and providing a user with an option to delete multiple characters corresponding to an input error.

BACKGROUND

After a user inputs a sequence of characters, an error may be identified being in the middle of the sequence of characters. Currently, a user can correct the entire sequence of characters via an auto-correction function, which sometimes fails to provide replacement words that accurately reflect what the user intends to input. A user can also manually delete, character-by-character, the characters up to the position where an input error starts.

What is needed in the art are methods and systems that allows a user to efficiently delete characters corresponding to an input error and restart/continue inputting characters.

SUMMARY

Disclosed herein are methods and systems that allow a user, when entering a string of input characters, to remove multiples input characters at one time back to where a typographical error occurs in the string. The method offers improvement over the current character-by-character deletion method where a user hits a deletion key multiple times to remove input characters that include the typographical error.

In one aspect, the methods disclosed herein analyze the string of input characters on a character-by-character basis and detects when the string of input characters starts to diverge from known words. In some embodiments, data concerning commonly occurring typographical errors and word usage are considered when determining the location of the typographical error.

In another aspect, the methods disclosed herein analyze the string of input characters to predict a word that is intended by the user entering the string. The location of one or more typographical errors can then be identified by comparing the intended word with the string of input characters entered by the user.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Figure 1:
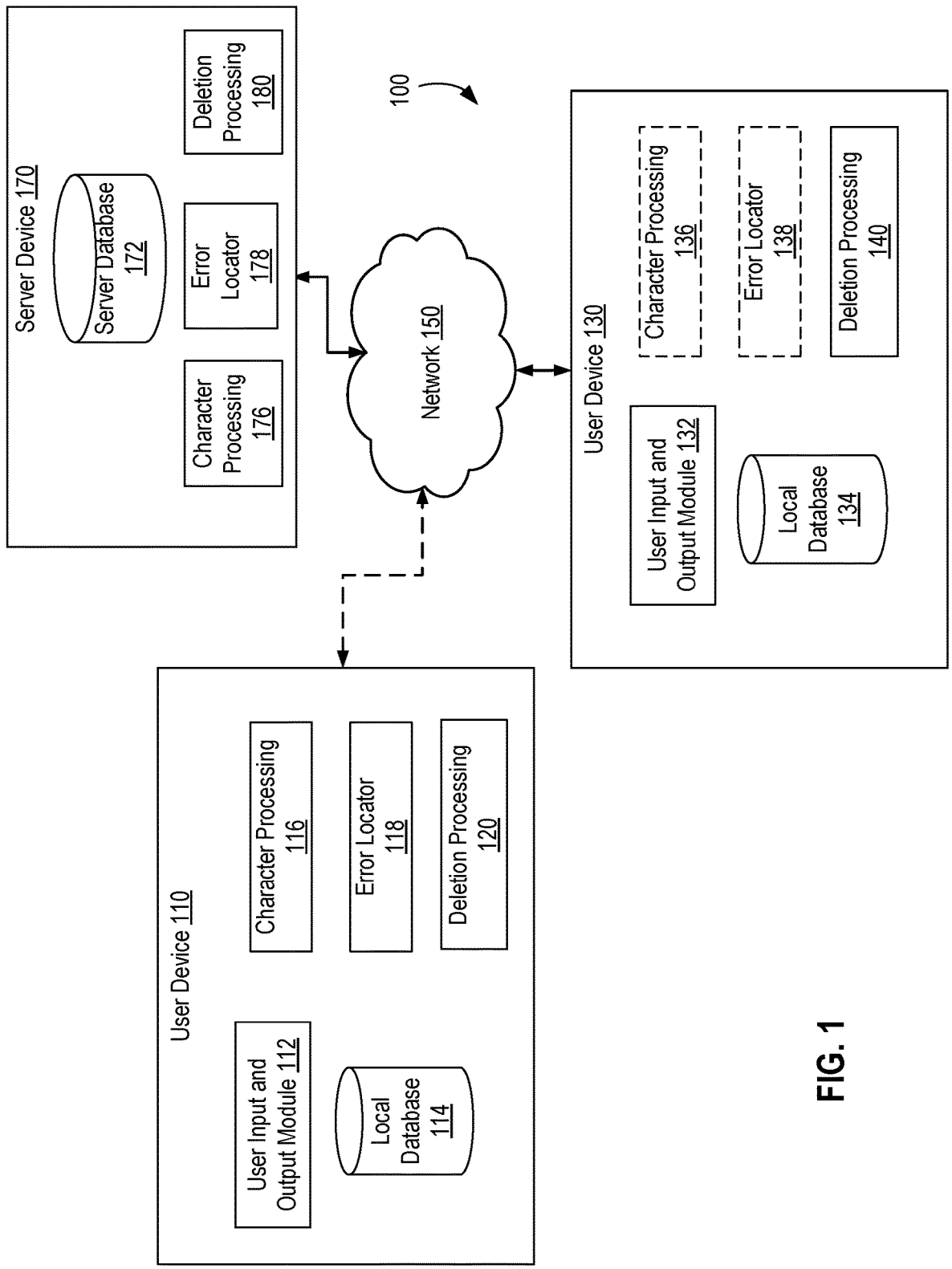
FIG. 1 is a block diagram of an example system that allows a user to intelligently delete back to a typographical error in a string of input characters.

FIG. 1 is a block diagram of an example system that allows a user to intelligently delete back to a typographical error in a string of input characters. As disclosed herein, the terms "character" and "input character" are used interchangeably. As disclosed herein a "typographical error" or "input error" refers to the character in the string of input characters from which the string of input characters starts to diverge from a known word that may be intended by the user. In some embodiments, system 100 enables a user to intelligently delete multiple input characters at one time (e.g., with a single user input), back to an input error. In particular, the system can perform such intelligent deletions by determining at which character in the input string diverges from known or probable words and allowing the user to provide a single user input to delete back to the character. As disclosed herein, an input character includes but is not limited to letters and symbols in an alphabet, an abjad, an impure abjad, an abugida, a syllabary, a semi-syllabary, a logogram, a logophonetic entry, a shorthand writing symbol, a number, or a punctuation mark. Also as disclosed herein, an input character can be from any language, including western alphabet-based languages (such as English, French, Germany, Russian and etc.) and non-western languages (such as Arabic, Hebrew, Chinese, Japanese and etc.).

In some embodiments, system 100 can include one or more user devices (e.g., user device 110 and user device 130). The user devices can communicate with a server device 170 through network 150. For example, user device 110 and/or user device 130 can be computing devices, such as a laptop computer, smart phone, tablet computer, smart watch, in-car entertainment system, a laptop computer, desktop computers, computer terminals, television systems, e-book reader or a wearable device (e.g., smart watch, smart glasses, etc.), or any other type of computing device that processes textual input. Network 150 can be a local area network (LAN), wide area network (WAN), wireless network, the Internet, infrared, Bluetooth®, or a combination thereof. Server device 170 can represent one or more network-based computing devices for managing access to centralized resources or services in the network.

As disclosed herein, user device 110 can perform the intelligent deletion operations described herein locally to identify and intelligently delete back to a typographical error in a string of input characters, with little or no contribution from server device 170. User device 130, on the other hand, may rely on server device 170 for assistance to complete the task of identifying and intelligently deleting back to a typographical error in a string of input characters.

In some embodiments, user device 110 can include a number of functional modules to achieve the various functionalities described herein. In some embodiments, user device 110 can include a user input and output module (I/O module) 112. For example, I/O module 112 can receive user input to user device 110 and present output from user device 110 using audio, video, and/or haptic output mechanisms. In some embodiments, I/O module 112 can receive input characters via a physical or virtual keyword. For example, user device 110 can include, or be coupled to, a keyboard (e.g., physical or virtual keyboard) for providing the character input to user device 110. User I/O module 112 can receive and provide the character input to other modules as described herein below. I/O module 112 can receive input characters by writing on a touch sensitive display of user device 110. In some embodiments, user input and output module 112 include other input devices that are not a part of user device 110 but one or more external modules that are connected user device 110. Such external modules include but are not limited to a keyboard, a mouse, a touch sensitive input component, etc. User device 110 receives user input from these devices.

In some embodiments, I/O module 112 can present audio, visual, and/or haptic output to the user. I/O module 112 can present graphical and/or audio output on behalf of other modules configured on user device 110. For example, user I/O module 112 can receive video and/or audio data from modules on user device 110 and present the video and/or audio data through a display and/or speakers coupled to user device 110. Also, for example, I/O module 112 can render graphical user interfaces (GUI) for performing intelligent deletions, as described herein. I/O module 112 can present GUIs that enable or support the functionality of one or more of the intelligent deletion modules described herein, including but not limited to character processing module 116, error locator module 118, and deletion processing module 120. In some embodiments, the user input and output module includes a plurality of menu commands, each corresponding to the functionality of one or more of the image processing modules. In some embodiments, I/O module 112 can allow a user to enter input characters via voice commands. Additionally, for example, I/O module 112 can allow a user to enter commands by tapping a touch screen.

In some embodiments, instead of using a keyboard (physical or virtual) for character entry, a user can verbally enter the sequence of input characters using voice. Here, input error may result from the user's accent or interferences from the environmental. Although not explicitly described, the method and system disclosed herein are not limited to text input, but are applicable to characters entered by any method or combination of methods.

In some embodiments, I/O module 112 receives the input characters before the input characters are processed by other functional modules such as character processing modules 116, error locator module 118, and deletion processing module 120. In some embodiments, I/O module 112 receives the input characters concurrently as one or more functional modules (e.g., character processing modules 116, error locator module 118, and deletion processing module 120) process the input characters.

In some embodiments, user device 110 includes a local database 114. For example, local database 114 can store dictionaries or libraries associated with multiple languages. In some embodiments, local database 114 can store one or more dictionaries for each language. In some embodiments, local database 114 can store sequences of input characters, partially or fully processed sequences of characters organized in one or more dictionaries each corresponding to a particular language. As used herein, the term "dictionary" or "library" is used to generally refer to a collection of information that can be helpful in identifying an input error in a sequence of input characters. As such, the dictionary can include but is not limited to information such as words, phrases, maps or statistical tables associated with word entries in the dictionary, general attributes for determining input errors, or individualized attributes for determining input errors. In some embodiments, a dictionary or library comprises multiple sub-files. In some embodiments, a dictionary comprises a core part and one or more non-core parts. Content of the core part remains relative constant while content of the one or more non-core parts is updated periodically to reflect changes. As disclosed herein, the terms "dictionary" and "library" are used interchangeably.

Generally, as noted above, a dictionary can be language-specific; i.e., entries in a dictionary are restricted to a particular language. In some embodiments, a dictionary for a language may include entries corresponding to a different language. For example, many languages use terms such as "DNA" and "IPO," sometimes to form compound words. As such, an entry starting with DNA in the Chinese language would not necessarily be considered an error automatically, even though the string entry is in a different language. Whether the entry in a different language is a typographical error can be determined by the context of the string input. For example, the term "DNA" used in the context of biotechnologies or genetics will not be considered a typographic error. In some embodiments, a dictionary would include specials rules for addressing such occurrences.

In some embodiments, a word entry in a particular dictionary is associated with a probability value representing a frequency by which the word is used in the particular language. In some embodiments, the probability value of a word is determined by surveying publications in a particular language over a period of time. For example, more commonly used words in the English language during the past five years will receive higher probability values. In some embodiments, the statistical values associated with the words may change with time or context. For example, during or after a major sports event, for example, the Super Bowl, a user is more likely to enter sequences of input characters corresponding to words relating to the major sports event. As such, such words will temporarily have higher probability values. In some embodiments, the probability value associated with a word may change relative to other words in an input string near (e.g., input before or after) the word. For example, after the word "merry," a word starting with the letter "c" is very likely "Christmas." As such, the word "Christmas" will have a high probability value. In some embodiments, based on a user's preference in word use, words that are often used by the user of device 110 will receive higher probability values. In practice, user device 110 can download official dictionaries from server device 170 and may periodically create local updates to the dictionaries to reflect contextual and individualized features associated with different words.

Figure 4:
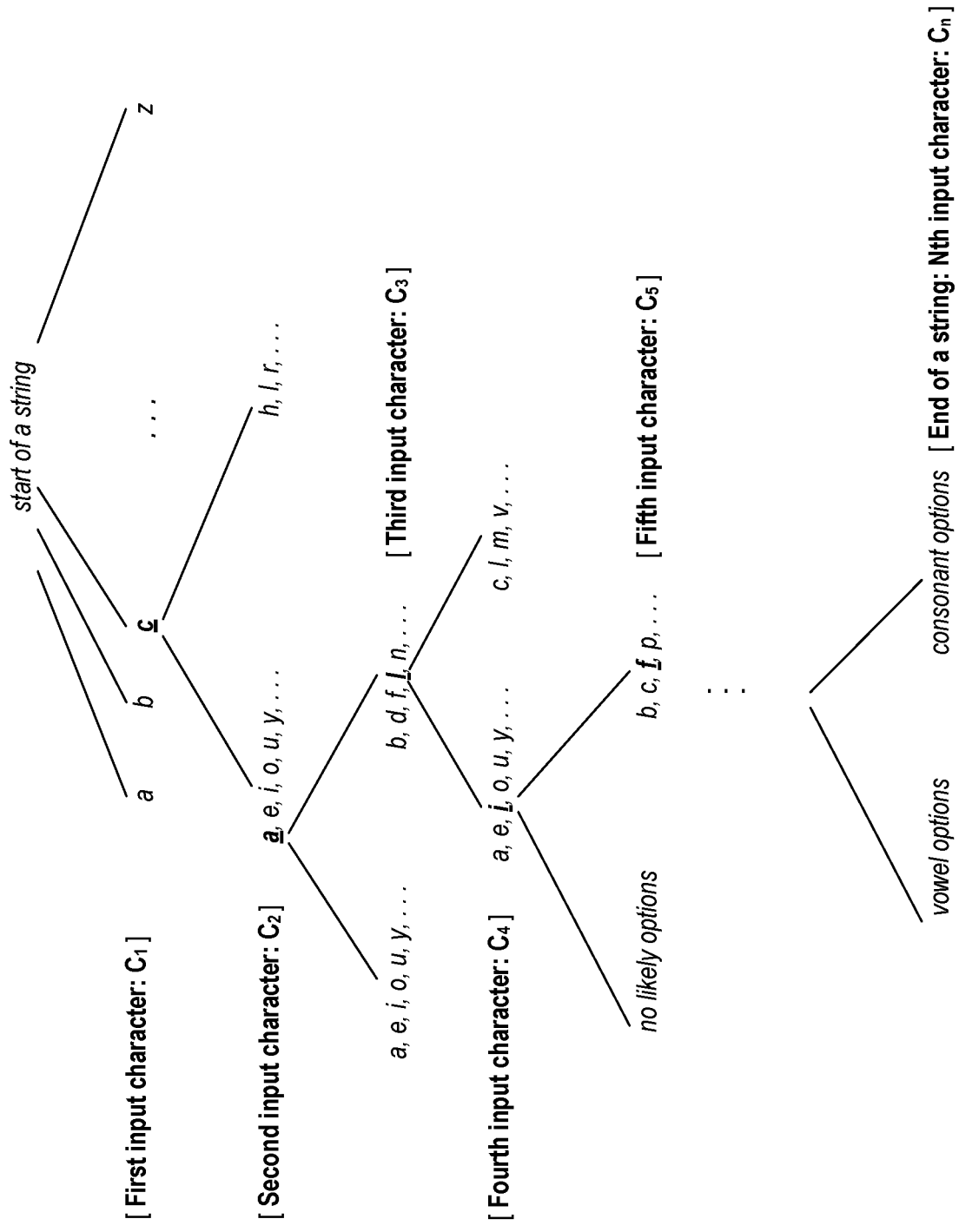
FIG. 4 depicts an example data tree structure illustrating a character-by-character analytical process for identifying a typographical error in a string of input characters.

In some embodiments, local database 114 includes a tree-like map for each word (e.g., FIG. 4). For example, the tree-like map includes data for identifying possible typographical errors based on character-by-character analysis of an input character string. Using the English language as an example, the first character in a sequence of input characters can theoretically be any one of the 26 letters. Once the initial input character is entered, only a subset of the 26 letters can be entered as the second character such that the two characters would form at least a part of a known word. As additional characters are entered, there will be fewer letters that can be entered as the next input character that will still form, with the preceding input character, all or a part of a known word. In other words, the tree-like map is likely to have fewer branches as fewer words match the string of input characters including the additional characters input by the user. A detailed example analytic process for identifying a typographical error based on a tree-like map is illustrated in FIG. 4 and will be discussed in more detail later.

In some embodiments, a dictionary can be stored locally on a user device, such as in local database 114 on user device 110. In some embodiments, at least a part of the dictionary is updated periodically to reflect changes. In some embodiments, the dictionary has a built-in learning function and can be updated over time to incorporate user-specific information.

In some embodiments, local database 114 stores private user specific information. For example, a user can locally store information of individualized attributes on user device 110 that is not shared with other devices or the server. Such information can include but is not limited to personal word usage or preference, typing habit, input context, or combinations thereof. In some embodiments, local database 114 further comprises internet derived information, including but not limited to word usage information by the general population, commonly occurring typing errors, words associate with trending events, or combinations thereof. Such information can be retrieved at the time while a user device is processing and analyzing a sequence of input characters. Alternatively, such information can be downloaded and updated periodically before a user device processes and analyzes a sequence of input characters.

In some embodiments, local database 114 stores information retrieved from another device or a server. In some embodiments, local database 114 stores information retrieved from internet searches. For example, user device 110 can periodically retrieve and save trending information on the internet in local database 114. Such trending information can provide context information when determining input errors or predicting a word that a user intends to enter.

In some embodiments, local database 114 sends data to and receives data from one or more of the functional modules. For example, character processing modules 116 can receive input strings that are saved in local database 114. Processing modules 116 can then pass the processed strings to error locator module 118 to identify possible typographic errors within the input strings. Deletion processing module 120 can then present one or more deletion options to a user and delete back to a typographical error based on a selection from the user.

In some embodiments, user device 110 includes a character processing module 116. Character processing module 116 receives input characters from I/O module 112. In some embodiments, character processing module 116 receives an input character and initializes processing of the character. In some embodiments, character processing module 116 initializes processing after a sequence of input characters are entered. For example, processing of input characters may take place after each input character. In some embodiments, processing of input characters may take place after a pause in input. In some embodiments, processing of input character may take place concurrently as user input and the user receives deletion options after additional characters are entered after a mistyped word.

In some embodiments, character processing module 116 may take other approaches when processing input characters. For example, the first input character often provides little information on possible input error because there is little limitation on which letter can be used to start a word. As such, character processing module 116 process the first two characters together as a short string and then process the subsequent characters one by one. If a typographical error is identified among the first two characters, the two characters will be analyzed one by one. There is no need to process other characters.

In some embodiments, character processing module 116 evaluates input characters to predict a word that a user intends to enter. The intended word can then help to identify one or more typographical errors through comparison between the intended word and the actual input string. Starting from the second input character, the input characters form an input string. Character processing module can identifies one or more known words, e.g., using a dictionary stored in local database 114, which begin with the input string. As a user continues to input characters, the resulting input string changes accordingly. The corresponding known words starting with the input also change accordingly. In some embodiments, these known words are considered as candidate or matching words for predicting the word intended by the user. In some embodiments, due to typographical errors, words matching the input string do not actually lead to a correct prediction of the intended word. Instead, words including one or more variations of the sequence of input characters can help predict the intended word. For example, given the closeness of letter keys on a keyword (especially small virtual keyboards on handheld devices); a user intending to enter one letter may mistype another. For example, one hitting the letter "i" may actually intend to enter the letter "o" or "u." In some embodiments, instead of the actually entered sequence (e.g., "v-a-l-i . . . "), character processing module 116 can create variations of the entered sequence such as "v-a-l-o . . . " or "v-a-l-u . . . " and use such variations in subsequent analysis, in addition to the actually entered sequence of characters. The entered sequence and variations thereof can be used to predict the word intended by the user. Subsequent input characters will help identify the intended word. For example, a "d" followed by an "a" at the fifth and sixth positions in the input string will help identify the intended word as "validation" even if the initially enters "v-a-l-o" or "v-a-l-u." One or more typographical errors in the entered sequence can be identified by simple comparison of the entered sequence with the intended word.

In some embodiments, the first character will not be analyzed because it is impossible to determine whether a single character may correspond to an input error. In some embodiments, the first character provides a context for subsequent analysis. For example, when a user starts the sequence of characters by entering the letter "x" or "q," very few options will be available for a second character and still lead to correct known words in English. For example, if the letter "s" follows "x" or "q," error locator 118 (described below) may mark the first character as a potential error. In some embodiments, deletion processing module 120 may be triggered to provide a deletion option to delete both characters.

In some embodiments, user device 110 includes an error locator module 118 for identifying one or more typographical errors within a sequence of input characters. In some embodiments, error locator module 118 receives data, such as a sequence of input characters and associated analytic results such as probability values of matching words including the input characters, from character processing module 116. In some embodiments, when an input character no longer forms a string that match a known word, error locator module 118 can mark the particular input character as a possible typographical error.

In some embodiments, an input error can be determined even when the input string matches known words. For example, when an input character is added to a string, the string may still match one or more known words; however, the probability associated with each of the one or more known words is so small that none of the one or more known words is a possible word options. In some embodiments, error locator module 118 can mark the particular input character corresponding to those matching known words as a possible typographical error.

For example, for each input character, error locator 118 can receive the corresponding string, any string variations, and/or candidate words from processing module 116. In some embodiments, error locator 118 identifies a probability value associated with each matching known word. In some embodiments, the probability value reflects the use of the candidate word by the general population or a preference or tendency of the user. When the probability value is below a pre-determined threshold probability value, the word can be removed as a possibility as the word intended by the user. For example, if the pre-determined threshold probability value is 0.1 and each of matching known words have a probability value lower than 0.1 (e.g., 0.05), error locator module 118 can mark the particular input character corresponding to those matching known words as a possible typographical error. A word with a probability value below the pre-determined threshold is a low probability word, which is likely associated with a potential input error.

In some embodiments, additional attributes such as personal habits, context information, and treading information will be considered in addition to a probability value that reflects word usage. In some embodiments, these additional attributes can be used to refine probability values. For example, if a commonly used word is out of context, processing module 116 takes it into consideration and provides a low probability value.

In some embodiments, a user can choose a setting that corresponds to a particular pre-determined threshold probability value. For example, a person who is very concerned about typographical errors can set the pre-determined threshold probability value relatively high (e.g., at 0.3 or higher), which allows error locator 118 to more easily mark an input character as a potential input error. As disclosed herein, the pre-determined threshold probability value can be 0.3 or lower, 0.25 or lower, 0.2 or lower, 0.15 or lower, 0.1 or lower, or 0.05 or lower.

Error locator module 118 identifies a typographical error when there are effectively no candidate words starting with the first input character ending with a particular input character. Here, "effective no candidate word" means that error locator module 118 may identify one or more candidate words; however, the usage of these words is so rare, or the candidate words are so out of context with words previously entered by the user or otherwise that there is effective no possible candidate word. As such, error locator module 118 may identify the particular input character as a potential typographical error.

In some embodiments, error locator module 118 may identify multiple candidate words based on an input string or variations thereof. For example, if most candidate words have probability values below the pre-determined threshold value and the word with the higher probability is more likely to be the word intended by the user and the point where the input string start to diverge from the intended word can be the typographical error. In some embodiments, deletion processing module 120 may present more than one options to allow the user to delete back to a particular character of the user's choosing.

In some embodiments, an input character still forms a string that match one or more known words; however, none of the one or more known words is a possible word option as the intended word in light of the context information. Here, the context information includes the context of previously entered words, one or more deduced topics based on the previously entered words, a communication context (e.g., the user typing a message to customer service at Amazon® or requesting an appointment from a doctor), a trending context (e.g., the user texting friends about US presidential election results) and etc. Error locator module 118 can also mark the particular input character as a possible typographical error.

In some embodiments, error locator module 118 considers both probability and context information and identifies a typographical error when identifying a potential typographical error. In some embodiments, the probability value reflects word usage and other attributes such as context and personal typing habits, which enables a one-step analysis based on probability value instead of multiple-step sequential analysis.

In some embodiments, the probability values and/or context are determined based on information stored in local database 114. In some embodiments, the probability values and/or context are determined based on information stored on a remote server such as server device 170. In some embodiments, the probability values and context are determined based on information retrieved in real-time via network connection.

In some embodiments, error locator module 118 receives the string of input characters directly from I/O module 112. In such embodiments, error locator module 118 can perform both character analysis (e.g., the functions of processing module 116 and identification of typographical errors. A separate processing module 116 is no longer necessary. In such embodiments, any processing methods disclosed in connection with processing module 116 may be applicable for error locator module 118.

For example, error locator module 118 analyzes each input character to determine if a particular character corresponds to an input error. In some embodiments, input errors are identified based on a matching process. For a particular input character, if an input string ending with the particular character does not match, or does not effectively match (e.g., a matching word is a low probability word), any word in a dictionary, an input error is identified among characters between the first character and the particular character. In some embodiments, an input error is identified when error locator module 118 identifies no candidate word ending with a particular input character. In some embodiments, error locator module 118 can process multiple characters at a time. For example, error locator module 118 can take the first few characters (e.g., two or three characters) and treat them as a continuous string, and conduct subsequent searches against a dictionary using the string. If the searches identify multiple words (i.e., candidate words) that start with the string, an assumption can be made that the first few characters do not include an input error. In such embodiments, error locator module 118 continues to analyze the remaining characters following the first few characters, either individually or multiple characters at a time (e.g., the entire input string).

In some embodiments, error locator module 118 can determine if a sequence of input characters includes an input error by first determining or predicting the word that a user intends to enter. In such embodiments, it may be advantageous to use a string including multiple input characters or the entire sequence of input character. In some embodiments, a variation of the string may be used for determining or predicting the intended word; for example, by identifying one or more candidate words that start with the string. In some embodiments, error locator module 118 predicts the intended word after one iteration of analysis. In some embodiments, error locator module 118 predicts the intended word after multiple iterations. In some embodiments, error locator module 118 predicts the intended word based on information in addition to the sequence of input characters. In some embodiments, error locator module 118 predicts an intended word among multiple candidate words, using general attributes including but not limited to popular words, common typographical errors, general trending information, or combinations thereof. In some embodiments, error locator module 118 predicts an intended word among multiple candidate words, based on individualized attributes including but not limited to personal vocabulary, word usage or preference, typing habit, input context, or combinations thereof.

In some embodiments, error locator module 118 predicts an intended word among multiple candidates words, based on both general and individualized attributes. In some embodiments, error locator module 118 identifies an input error, based on both general and individualized attributes. In some embodiments, error locator module 118 identifies an input error, based on general attributes including but not limited to popular words, common typographical errors, general trending information, or combinations thereof. In some embodiments, error locator module 118 identifies an input error, based on individualized attributes including but not limited to personal vocabulary, word usage or preference, typing habit, input context, or combinations thereof.

In some embodiments, error locator module 118 may terminate after one input error is identified and deletion processing module 120 will present a deletion option to the user. In some embodiments, error locator module 118 may identify multiple input errors. For example, after error locator module 118 identifies an input error by concluding that there is effectively no candidate word because the string entered at the point corresponds to only a uncommonly used word, error locator module 118 may continue to analyze one or more remaining characters. In some embodiments, subsequent analysis (e.g., a contextual analysis) may confirm that the earlier-identified error may indeed be an error. In some embodiments, the same type of subsequent analysis may also reveal that the earlier-identified error is not an error. For example, based on word usage probability analysis, an input string corresponds to a very rarely used technical term with a very low probability value. However, the input context relates to communications concerning specialized scientific research. In light of the additional contextual information, error locator 118 will not conclude that the input string contains a typographical error.

In some embodiments, the functionalities of character processing module 116 and error locator 118 are combined in one functional module. In some embodiments, more functionalities may be combined in a single functional module. For example, a user may choose to enter the input characters via voice. As such, the processing module 116 may include voice recognition functionalities. In some embodiments, user device 110 includes a deletion processing module 120, which provides options allowing a user to delete characters back to an input error. For example, identification of an input error can trigger deletion processing module 120. Any suitable interface can be used to facilitate the deletion process. In some embodiments, deletion processing module 120 presents a user with a deletion option by highlighting the characters to be deleted. A user can then hit a key once (e.g., the delete key) and delete multiple characters at the same time. In some embodiments, deletion processing module 120 may present multiple one or more deletion options to a user in a pop-up menu. A user can delete the characters corresponding to a particular option by tapping the option on the pop-up menu.

In some embodiments, deletion processing module 120 may present one or more deletion options to a user after a user enters each sequence of characters. In some embodiments, deletion processing module 120 may present one or more deletion options to a user after a user enters multiple sequences of characters. In the latter case, the methods and systems disclosed herein can be used for post-entry processing or editing; for example, to allow a user to review a sentence, a paragraph, or a short article. In such embodiments, deletion may take place wherever a possible input error is located. For example, a user can delete and correct a typo in one sentence, skip a couple of sentences containing no input error, and then delete another typo in another sentence.

Referring back to FIG. 1 and as disclosed above, user device 110 can receive and process a sequence of input characters entirely locally. In other embodiments, a user device (e.g., device 130) may interact with another device (e.g., a remote server such as server device 170) to complete the same process. For example, as illustrated in FIG. 1, user device 130 includes user input and output module 132 (I/O module 132), a local database 134, and a deletion processing module 140. Here, I/O module 132 and local database 134, and deletion processing module 140 can adopt any configuration or combinations of configurations as those disclosed in connection with user device 110.

In some embodiments and in comparison to user device 110, user device 130 lacks one or more functional modules such as character processing module 136 and/or error locating module 138. Instead, user input and output module 132 receives the sequence of input characters and communicates the sequence of input characters to another device (e.g., server device 170); for example, via network 150. In some embodiments, I/O module 132 transfers input characters to the other device (e.g., server device 170) immediately after each character is entered. In some embodiments, I/O module 132 transfers input characters to the other device (e.g., server device 170) immediately multiple characters in the sequence are entered. In general, a server device often has large memory storage capacities and/or high processing speeds. As such, in some embodiments, it is more efficient to have most processing and analysis take place on server device 170.

In some embodiments, system 100 can include server device 170. For example, server device 170 can represent one or more network-based computing devices for managing access by user devices (e.g., user device 110 and/or 130) to centralized resources or services in the network. As disclosed herein, a dictionary can be stored on service device 170, and accessed dynamically by, for example, user device 130 while a user enters input characters.

Functional modules described in connection with user device 110 or user device 130 may be implemented on server device 170. For example, server device 170 can include a server database 172 for storing any data, processed or raw. In some embodiments, service device 170 stores, e.g., in server database 172, information relating to general attributes of words such as word usage information by the general population, commonly occurring typographical errors, words associated with trending events, or combinations thereof. In some embodiments, service device 170 can also store individualized attributes; for example, as a part of a user profile access to which is restricted to the associated user. In some embodiments, server database 172 stores one or more dictionaries that are accessible dynamically to a user device (e.g., device 130) when a user is entering input characters. In some embodiments, server database 172 stores information that provides a context for identifying an input error. In some embodiments, server database 172 stores information relating to general attributes such as word usage information by the general population, commonly occurring typing errors, words associate with trending events, or combinations thereof. In some embodiments, server database 172 can also store individualized attributes. In some embodiments, server database 172 includes a user profile including information on such individualized attributes. In some embodiments, access to the user profile is restricted to only authorized users.

In some embodiments, server device 170 can also include a character processing module 176 for receiving and analyzing input characters entered by a user using user device 110 or user device 130. For example, character processing module 176 can dynamically identify known words that match an input string as the input string continues to receive additional input characters. Also, for example, character processing module 176 can associate each known word with a probability value representing the extent of use of the word in a particular language, and or by the particular user. In some embodiments, the probability value is stored on database 172; for example, in one or more dictionaries.

In some embodiments, server device 170 can include an error locator module 178 for identifying one or more typographical errors in a string of input characters. In some embodiments, server device 170 can include a deletion processing module 180. Deletion processing module 180 sends deletion options to user devices so that actual deletions take place on user devices.

As disclosed herein, server database 172, character processing module 176, error locator module 178 and deletion processing module 180 can adopt any configuration or combinations of configurations as those disclosed in connection with user device 110.

In some embodiments, character processing module 176, error locator module 178, and deletion processing module 180 of server device 170 carry out their functions similar to those described in connection with user device 110.

Figure 2A:
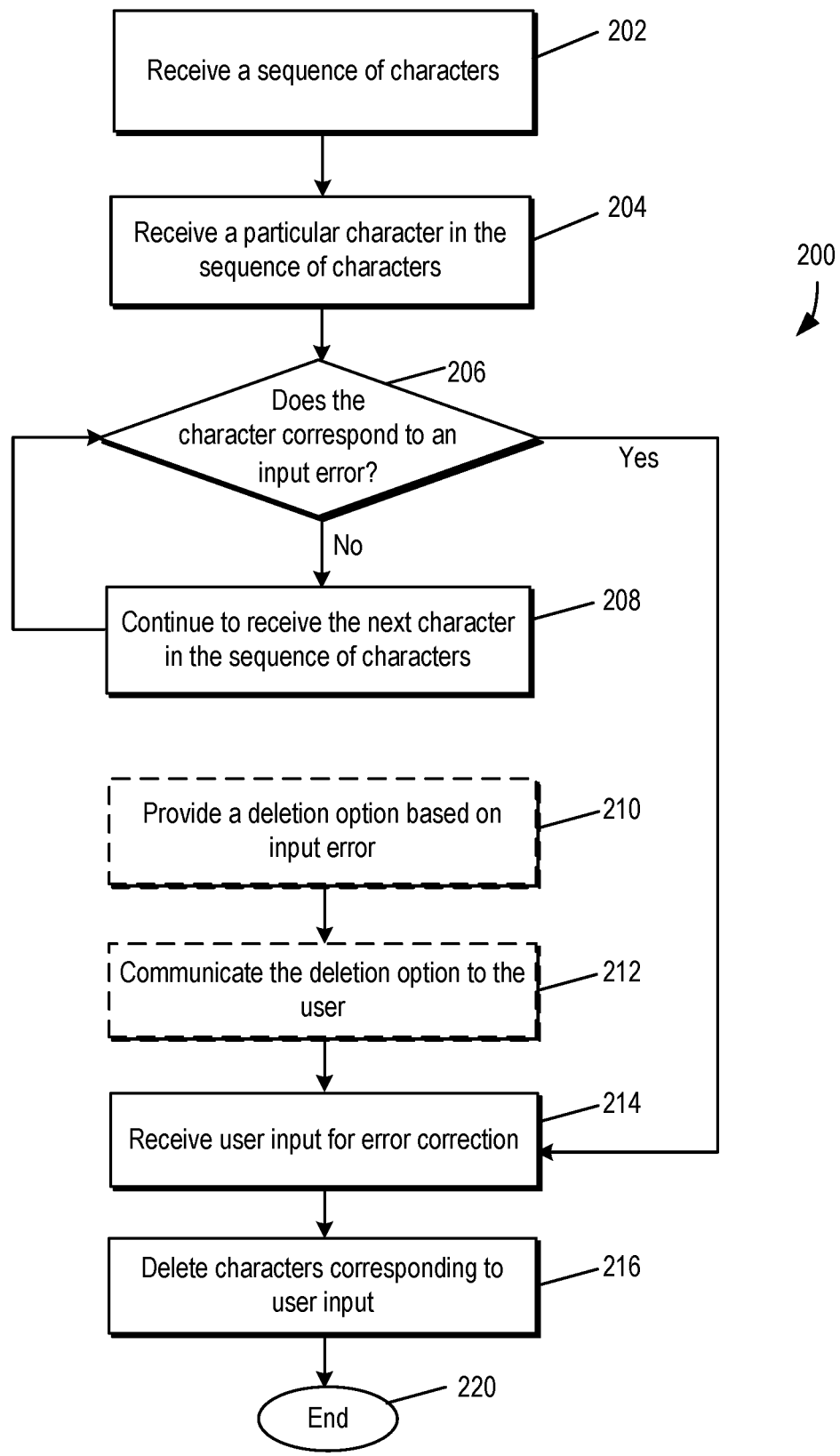
FIG. 2A is flow diagram of an example process of intelligently deleting back to a typographical error in a string of input characters based on character-based analysis.

FIG. 2A is flow diagram illustrating an example process of intelligently deleting back to a typographical error in a string of input characters based on character-based analysis. Process 200 provides an example of an intelligent error removal method for deleting multiple input characters at one-time back to a typographical error in a sequence of input characters. As shown in illustration 200, a computer device first receives a sequence of characters. Subsequent analysis is carried out to determine whether a particular character in the sequence of characters corresponds to an input error. Once an input error is identified, a user can choose to delete characters up to and including the particular character. This method allows one to delete multiple characters at a time (e.g., with a single input). Process 200 illustrate the steps for intelligent deletion of multiple input characters at one-time back to a typographical error in a sequence of input characters in a single computer device. However, it will be understood that, following character input, the steps for processing input characters and identifying one or more typographical errors in a sequence of input characters can take place on a different computer device such as a server device before the computer device is provided with one or more deletion options. In some embodiments, the steps for processing input characters and identifying one or more typographical errors in a sequence of input characters can occur between the local computer device and server device.

At step 202, a computer device receives a sequence of characters from a user; for example, via an I/O module. The user may choose to enter the sequence of characters using any input device, including but not limited to a physical keyboard, a virtual onscreen keyboard, a writing pad, a microphone, a camera, or combinations thereof. In some embodiments, the entire sequence of characters is received at step 202, prior to subsequent analysis. In some embodiments, multiple sequences of characters are received at step 202 prior to subsequent analysis. In some embodiments, entry of an initial character triggers one or more subsequent steps, such that subsequent analysis takes place concurrently as additional characters are received. For example, process 200 can be performed iteratively as each character in an input string is received. As disclosed herein, the sequence of characters (e.g., a string of characters) is usually received at a user device such as user device 110 or 130.

At step 204, the computer device can receive a particular character in the sequence of characters. For example, functional modules such as character processing module 116/176 and/or error locator module 118/178 receive a particular character in the sequence of characters. The particular character can also be referred to as the "current character." In some embodiments, these functional modules receive one input character at a time. In some embodiments, these functional modules receive multiple input characters at a time. In some embodiments, step 204 takes place on a user device such as device 110 or 130. In some embodiments, step 204 takes place on a server device such as device 170, and characters from a user device are transmitted to the server device via a network connection.

At step 206, the computer device can determine whether the particular character corresponds to an input error. For example, one or more functional modules (e.g., character processing module 116/176 and error locator module 118/178) determine whether the particular character corresponds to an input error. For example, character processing module 116 identifies a current string, which includes the particular character and any character or any characters preceding the particular character in the sequence of characters. In some embodiments, an input error is determined when the current string does not match a known word in a particular language. In some embodiments, an input error is determined when the current string only matches one or more rarely used words in a particular language. In some embodiments, an input error is determined when the current string matches one or more words in a particular language; however, the one or more words are out of context with the words previously entered by the same user. In some embodiments, step 206 takes place on a user device such as device 110 or 130. In some embodiments, step 206 takes place on a server device such as device 170.

If the particular character does not correspond to an input error, process 200 can continue to step 208. When the particular character does correspond to an input error, process 200 can continue to step 210.

At step 208, the computer device can receive the next character in the sequence of character. For example, functional modules such as character processing module 116 and/or error locator module 118 receive the next character in the sequence of character. A new round of analysis is carried out to determine whether the next character correspond to an input error.

At step 210, the computer device provides a deletion option based on the input error identified in previous steps. The deletion option can remove, in one single action, the most recently entered character up to the character where the input error has occurred. For example, the user may be focused on selecting characters from a keyboard and not notice the input error until a few additional characters have been entered following the error. The deletion option can allow the user to intelligently delete back (e.g., removing the error character and all subsequently entered characters with a single input). The deletion option can be presented to a user in various ways. In some embodiments, the computer device presents the deletion option in a pop-up menu. In some embodiments, a portion of the input characters (e.g., that is associated with an input error) can be visually marked for deletion or correction. For example, visual markings include but are not limited to underlining, italicizing, making bold, highlighting, coloring, flashing, or any other type of visual indications. In some embodiments, multiple visual markings can be applied to the portion of the input characters to be subject to deletion or correction. For example, the to-be-deleted input characters can be in a different color or different style from the other characters. In some embodiments, the to-be-deleted input characters are any or a combination of: underlined, highlighted, colored, or in other ways marked. In some embodiments, to-be-deleted characters can be underlined and italicized.

At step 212, the computer device receives user input concerning the deletion option. In some embodiments, the user input is selecting an item on the pop-up menu. As noted, the deletion option can remove multiple characters in one single action, from the most recently entered character up to the character where the input error has occurred. For example, the user input can include pressing a delete key on a keyboard (virtual or physical) to remove characters that are marked for deletion. In some embodiments, the user input can include tapping or pressing highlight input characters to execute deletion. In some embodiments, the user input can include selecting a deletion option from multiple deletion options (e.g., from a menu). In some embodiments, the user input can include declining to delete any characters.

At step 214, the computer device can delete the characters corresponding to the typographical error. For example, in response to receiving the user input at step 212, the computer device can delete the character corresponding to the typographical error and all subsequently entered characters. In some embodiments, deletion is triggered when the computer device receives a deletion option via a user interface. In some embodiments, deletion is triggered when the computer device receives gesture input from a user on the highlighted characters. Example user gesture input includes but is not limited to any or a combination of a hard press, a force touch, a long hold, double tapping the delete key, holding down the delete key, a combination of shift and delete keys, or a combination of option and delete keys. In some embodiments, a computer device may not perform the deletion action when a user declines the deletion option and confirms that the input characters contain no error. In some embodiments, the original strings or sequences of input characters may be incorporated into local database or server database, or both, to update a dictionary for the particular language. The example method then ends at step 220.

Figure 2B:
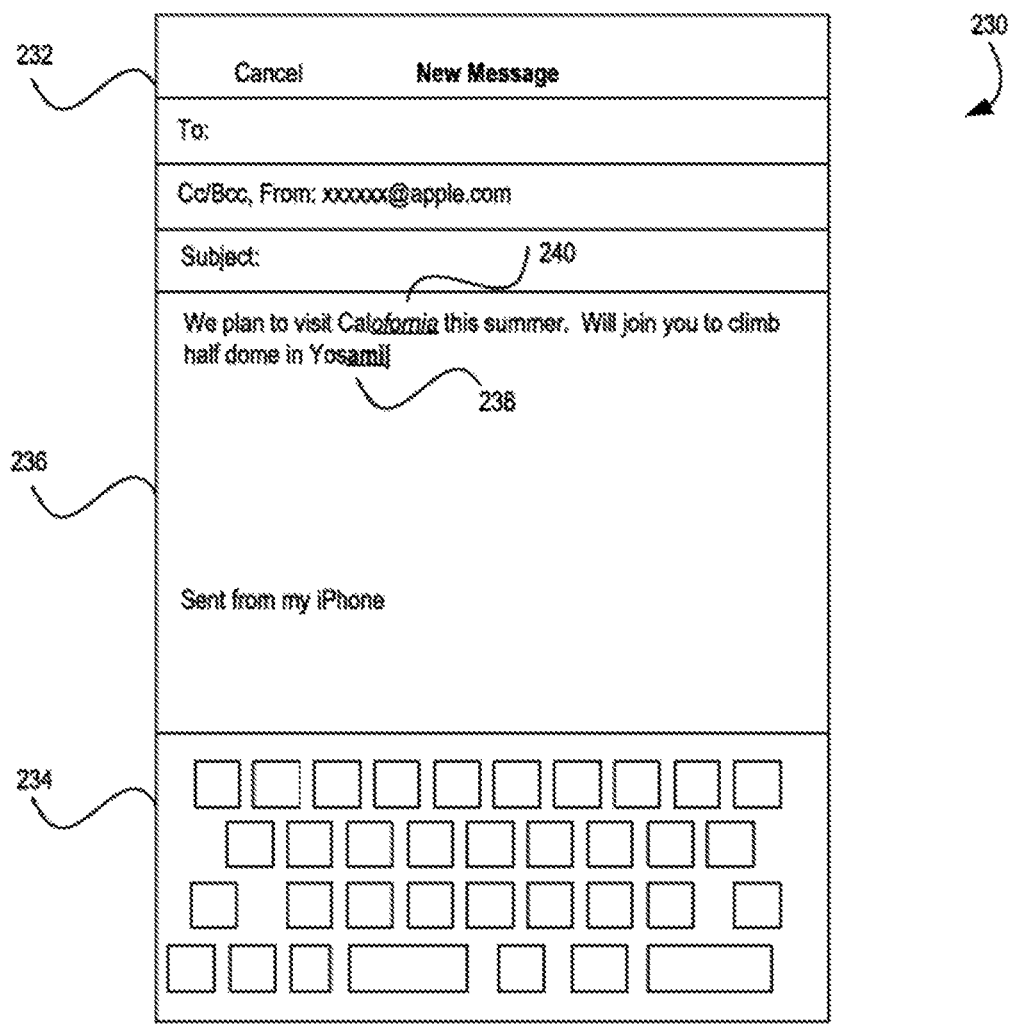
FIG. 2B is an example user interface for receiving strings of input characters, illustrating possible ways to present to-be-deleted input characters.

FIG. 2B is an example user interface for receiving strings of input characters, illustrating possible ways to present and delete to-be-deleted input characters. Example user interface 230 allows a user to compose a new email message.

In some embodiments, user interface 230 includes header 232 where a user can enter the address of the email recipient. In some embodiments, message body 234, and a virtual keyboard 234. In some embodiments, user interface 230 can include a message body 236 for displaying text input from virtual keyboard 234.

In some embodiments, a portion of the input characters can be visually marked for deletion or correction. For example, visual markings include but are not limited to any or a combination of: underlining, italicizing, making bold, highlighting, coloring, flashing, or any other type of visual indications. In some embodiments, multiple visual markings can be applied to the portion of the input characters to be subject to deletion or correction. For example, the to-be-deleted input characters can be in a different color or different style from the other characters. In some embodiments, the to-be-deleted input characters are underlined, highlighted or in other ways marked. In some embodiments, to-be-characters can be underlined and italicized. For example, the portion in error in element 238 is bolded and underlined, while the portion in error in element 240 is underlined and italicized.

In some embodiments, deletion of error can occur immediately while a word is still being input; see, for example, element 238 in FIG. 2B. The word "Yosemite" was misspelled as "Yosamil." The misspelled portion is underlined and bolded before the user completes entering the remaining of the characters for the word.

In some embodiments, input errors may be identified in words that have already been entered (see, e.g., element 240 in FIG. 2B). For example, the user intends to enter "California" but mistakenly entered "Calofornia." Here, the portion in error in is underlined and italicized and numerous words have been entered since the initial typographical error, including a new input error. In the example embodiment depicted in FIG. 2B, both errors are highlighted and presented to the user.

In some embodiments, a user can choose to delete the misspelled portion by selecting an option from a pop-up menu. In some embodiments, the user input can include pressing a delete key on a keyboard (virtual or physical) to remove characters that are marked for deletion. In some embodiments, the user input can include tapping or pressing highlight input characters to execute deletion. In some embodiments, the user input can include selecting a deletion option from multiple deletion options (e.g., from a menu). In some embodiments, the user input can include declining to delete any characters.

In some embodiments, deletion is triggered when the computer device receives gesture input from a user on the highlighted characters. Example user gesture input includes but is not limited to any or a combination of: a hard screen press, a force touch, a long hold, double tapping the delete key, holding down the delete key, a combination of shift and delete keys, or a combination of option and delete keys. For example, the user may tap the delete key to remove the highlighted portion in element 238. Also for example, the user may hard press the highlighted portion in element 240 to remove the typographical error without changing the correctly entered subsequent words.

In some embodiments, though not depicted in FIG. 2B, user interface 230 can present multiple deletion options for one word. For example, the intended word is "California," but a user makes two errors and enters "c-a-l-i-b-e-r-n . . . " Here, "f" is mistakenly entered as "b" whereas "o" is mistakenly entered as "e." Even though the user's subsequent entries match the letter in "California," there may be enough confusion that multiple deletion options may be created to recommend the user to delete all characters after "c-a-l-i" or "c-a-l." In some embodiments, a user interface (e.g., a pop-up menu) can present multiple deletion options allowing a user to selectively delete a portion of the input character string such as "l-i-b-e-r-n," "i-b-e-r-n," and "b-e-r-n," leaving the remaining characters as "c-a," "c-a-l," or "c-a-l-i." For example, a pop-up menu can be triggered by a user gesture input such as any or a combination of: a hard screen press, a long hold, double tapping, or holding down the delete key.

Figure 2C:
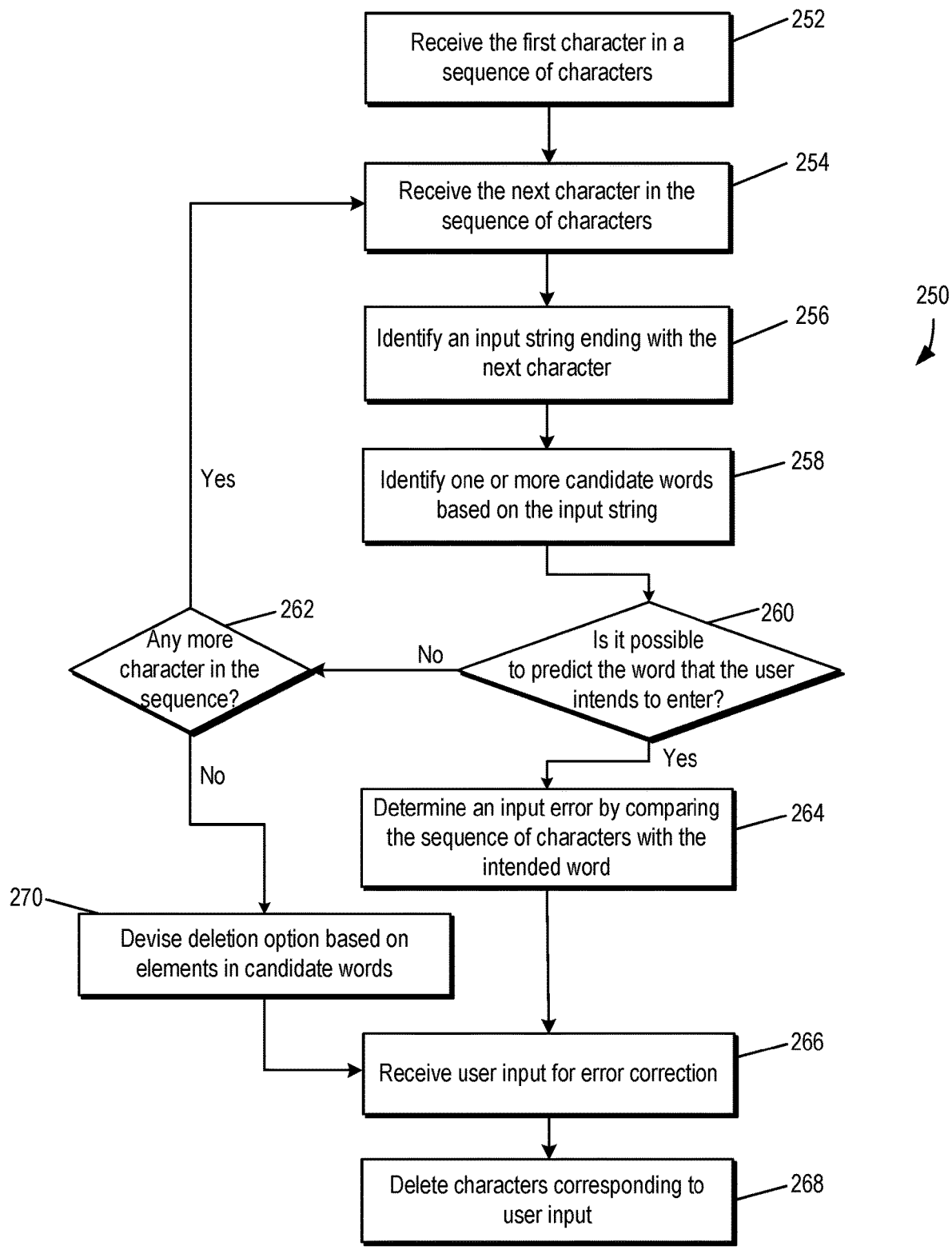
FIG. 2C is flow diagram of an example process of intelligently deleting back to a typographical error in a string of input characters based on word prediction analysis.

FIG. 2C is flow diagram of an example process of intelligently deleting back to a typographical error in an input string based on word prediction analysis. In particular, example process 250 illustrates how word prediction is used to identify input errors. For example, one or more functional modules can be implemented to first predict the word that the user intends to enter. The modules can then determine one or more input errors by comparing the sequence of input characters with the predicted word. As disclosed herein, the terms "predicted word" and "intended word" can be used interchangeably. For example, the example embodiment is implemented through a character processing module and error locator module (see, e.g., FIG. 1). In some embodiments, the method is implemented through a separate word prediction module. Such functional modules can be either on a user device or a server device. The following refers to a generic functional module when describing the example embodiment of identifying input errors based on word prediction. In some embodiments, the functional module may include multiple processing and/or analytical functionalities. In some embodiments, the functional module may include multiple processing and/or analytical sub-modules.

At step 252, a computer device receives the first character of the sequence of input characters. As noted previously, there are often few limitations on the first character in a word. For example, without any context information, a user may enter any one of the 26 letters in English to initiate a sequence of input characters.

When various context information is taken into consideration, some letters are more likely to start a word than other letters. For example, statistical data reveal that there are many more words starting with the letter "w" than those starting with the letter "q." As such, if a user enters the letters such as "q," "x," "y" or "u" as the first character of the sequence of characters, there is a likelihood that these letters may correspond to input errors because there are only a small number of words that start with these letter. In addition, the identity of the first character limits which letters can be used as the second letter. Similarly, the identities of the first and second characters will limit each subsequent character.

At step 254, the computer device receives the next character in the sequence of input characters.

At step 256, the computer device identifies form an input string including input characters that have been entered so far. Initially, the input string includes only two letters: the first character and the next character following the first character (i.e., the second character). For example, a user enters "c" as the first character and "a" as the second character, which results in an input string of "c-a."

At step 258, the computer device search in an English dictionary using the input string "c-a" and identify any words that begin with "c-a." In some embodiments, input error may occur at the beginning of the sequence of characters, making it impossible to identify any candidate words. For example, there are no words that start with "c-q." Therefore, it is possible one or both letters can be an input error. For example, the user might have intended to type "a" instead of "q" because the keys for these two letters are close to each other on the keyboard. Accordingly, in some embodiments, when the actual input string fails to lead to any candidate words, one or more variants of the input string may be generated based on one or more factors, including but not limited to key proximities, keyboard configuration, context information, common typing errors, personal typing habits, word preference, accent, tune, typing speed, talking speed, personal speech preference, and any other relevant information.

At step 260, the computer device analyzes one or more words including the input string or a variant thereof. If only one candidate word is identified, the computer device identifies the word as the word that the user intends to enter. In some embodiments, when there are multiple candidate words, context information can help to narrow the options down. However, it is often unlikely that the intended word can be determined with confidence based on only two characters.

At step 262, the computer device can receive and process additional characters in the sequence of characters when it is impossible to identify the intended word with confidence. If there is at least one remaining input character, the process 250 returns to step 254 and allows the next character in the sequence of characters to be added to the input string. The new input string becomes the basis for identifying candidate words and intended word. If there is no more character, the process 250 jumps to step 270 where one or more deletion options are devised based on elements in candidate words. In some embodiments, the candidate words may share one or more characters at the beginning. For example, the candidate words may all start with "c-a-l." A deletion option can be devised such that all other characters can be removed, leaving only "c-a-l." In some embodiments, an deletion option will be presented to allow a user to remove all characters and start anew.

When there are additional input characters, steps 254 through 260 will be repeated until it is possible to predict the intended word with confidence or until the functional module finishes processing and analyzing the last character in the sequence of characters.

At step 264, the computer device can compare the intended word with the sequence of characters to determine possible input errors. When there is one input error, the computer device creates a deletion option to allow a user to delete the input character in error and any subsequently entered characters in one single action. When there are multiple input errors, a deletion option is created to allow a user to select the correct deletion option.

At step 266, after one or more deletion options are presented to a user, the computer device receives user input specifying how an input error can be removed.

At step 268, the computer device can perform the intelligent deletion based on the user input; for example, removing the character in error and any subsequently entered characters in one single action.

Example System Interactions

Figure 3A:
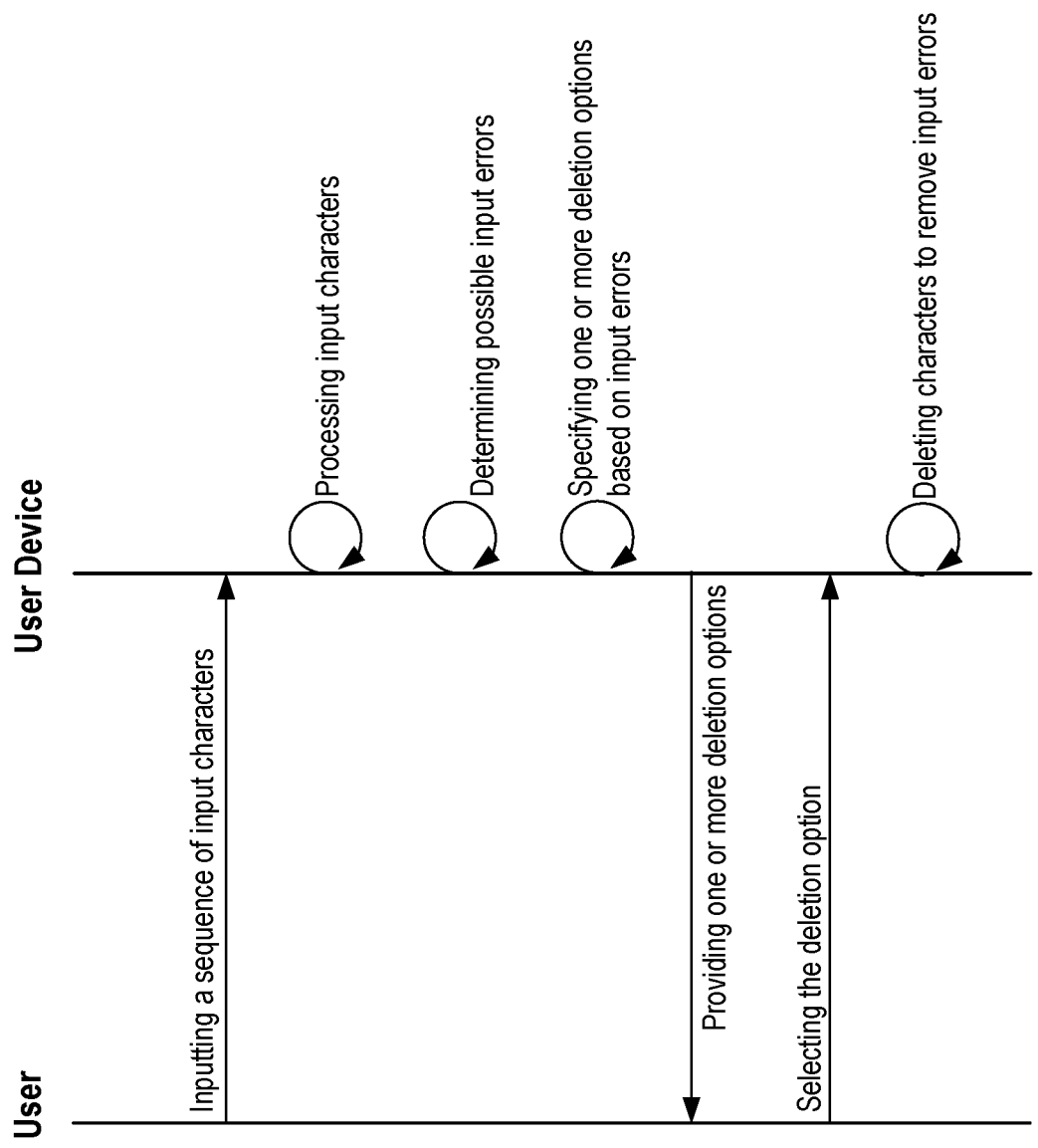
FIG. 3A illustrates example user-device interactions in an example process of intelligently deleting back to a typographical error in a string of input characters.
Figure 3B:
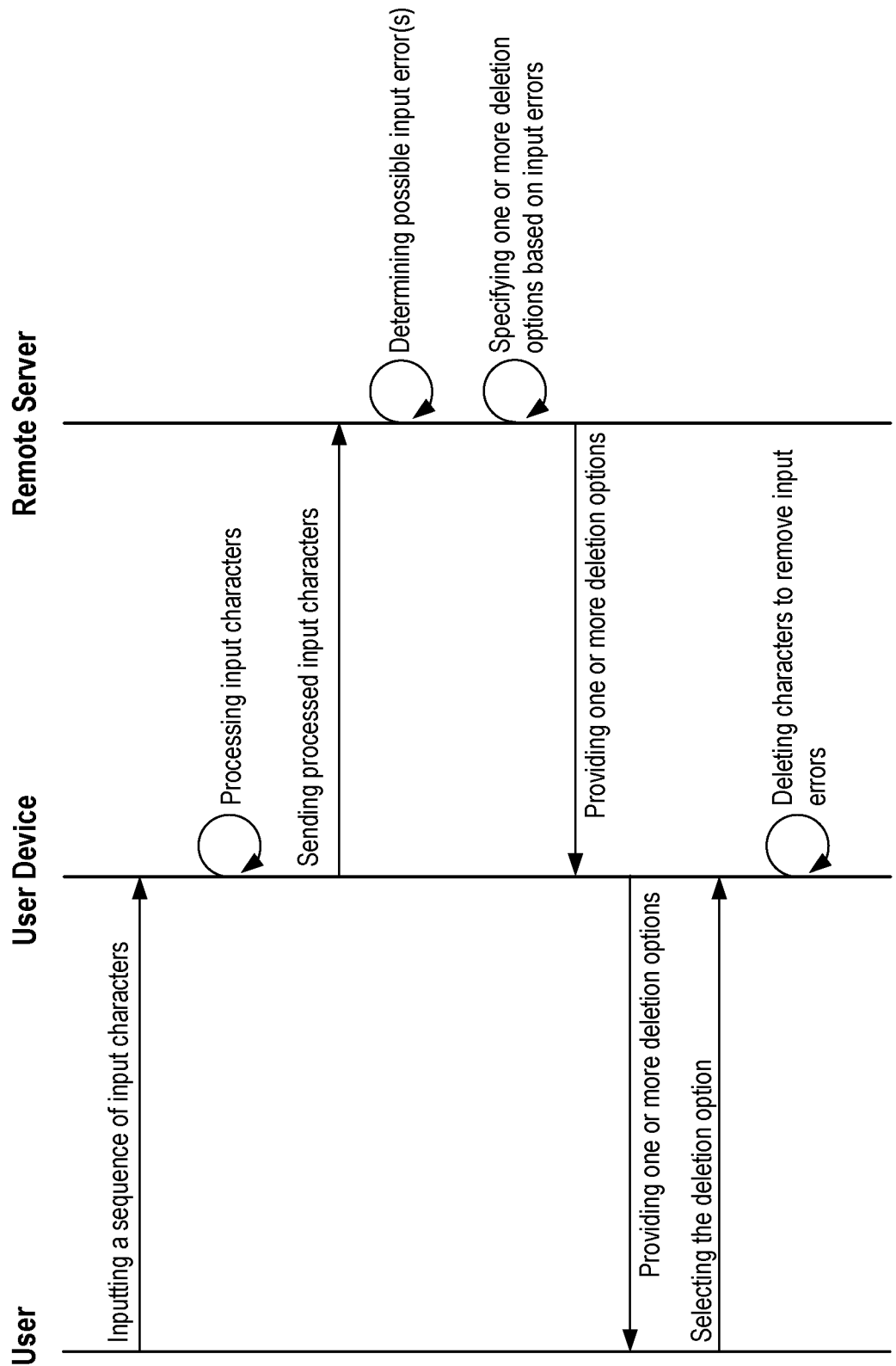
FIG. 3B illustrates example user-device-server interactions in an example process of intelligently deleting back to a typographical error in a string of input characters.
Figure 3C:
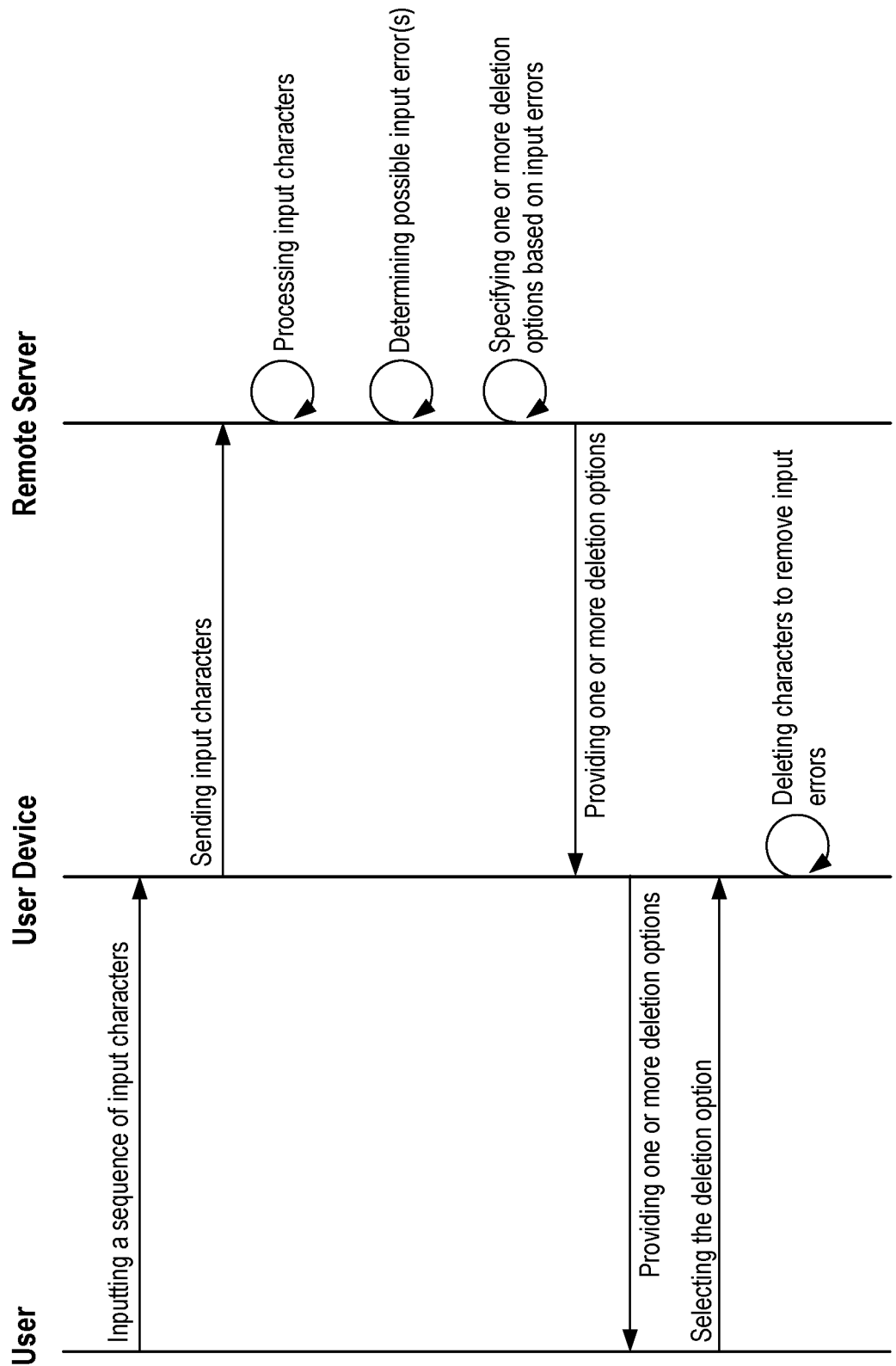
FIG. 3C illustrates example user-device-server interactions in an example process of intelligently deleting back to a typographical error in a string of input characters.

As illustrated in FIG. 1 and described above, a user device (e.g., device 110) can be fully enabled to receive directly or indirectly a string of input characters from a user; process the string; identify a typographical error; provide a deletion option to a user; and delete the input character in error and any subsequently entered characters in one single action. FIG. 1 also illustrates that, except the function of receiving the string of input characters directly from a user, other functionalities can be collectively performed by a user device (e.g., device 130) and a server device (e.g., 170). FIGS. 3A-3C illustrate the interactions between a user and different computer devices such as user devices 110 and 130 and server device 170.

FIG. 3A illustrates example user-device interactions in example operations relating to intelligently deleting back to a typographical error in a string of input characters in a single action. In such embodiments, a computer device is fully enabled to perform most or all the method steps to perform intelligent deletions of input errors. An example computer device is shown as user device 110 in FIG. 1.

At operation 302, a user provides inputs via an interface on a computer device. Details of operation 302 are similar to the description concerning step 202 from process 200 in FIG. 2A or steps 252 and 254 from process 250 in FIG. 2C. Example systems that can support operation 302 can be found in the description of user device 110; for example, in connection with I/O module 112. As disclosed herein, the computer device can be any suitable computing device such as a smartphone, a tablet device, a laptop computer, desktop computers, computer terminals, television systems, e-book reader or a wearable device (e.g., smart watch, smart glasses, etc.).

At operation 304, the computer device processes characters in the input string. For example, processing can be performed by processing module 116 of user device 110 in steps similar to those described in connection with steps 204-206 in FIG. 2A. Data needed for processing the input characters are stored locally on the device, for example, in a local database 114. In additional embodiments, a user may enable a learning feature of user device 110 to allow tracking of the user's typing habits, vocabulary usages and other activities. In some embodiments, the tracked data can be saved locally on the device, which is advantageous for privacy concerns. In such embodiments, an initial dictionary or library that comes with the program can be the same for all users. Different users can develop individualized sub-dictionaries or sub-libraries over time. In some embodiments, the dictionaries and libraries have segmented or modularized structures such that it will be possible to periodically update core functionalities without altering individualized data. In some embodiments, a user may choose to share the tracked data with a remote server.

At operation 306, the computer device can determine one or more input errors (e.g., typographical errors). For example, such determining can be performed by error locator module 118 of user device 110.

At operation 308, the computer device provides a deletion option based on an input error identified in previous operation. For example, deletion options can be created (e.g., by deletion processing module 120 based on information from error locator module 118), according to step 210 of FIG. 2A or step 270 of FIG. 2C.

At operation 310, the computer device can present the deletion option to a user via a user interface (e.g., I/O module 112 of user device 110). For example, operation 310 can be performed by deletion processing module 120 and I/O module 112 of user device 110 according to step 212 of FIG. 2A. In some embodiments, operation 310 can be performed by deletion processing module 120 and I/O module 112 of user device 110 according to step 266 of FIG. 2B. In some embodiments, established deletion options and user preference can be stored in local database 114 of user device 110.

At operation 312, the computer device can received a user input concerning the deletion option via a user interface (e.g., I/O module 112 of user device 110). After a user chooses to go forward with a deletion option, deletion of the input character is also carried out by the user device. For example, operation 312 can also be performed by deletion processing module 120 and I/O module 112 of user device 110 according to step 214 of FIG. 2A. In some embodiments, operation 312 can be performed by deletion processing module 120 and I/O module 112 of user device 110 according to step 268 of FIG. 2C. In some embodiments, established deletion options and user preference can be stored in local database 114 of user device 110.

FIG. 3B illustrates example user-device-server interactions in an example process of intelligently deleting back to a typographical error in a string of input characters. FIG. 3B depicts example interactions between a user, a user device and a remote server; for example, when steps for enabling the current method are performed collectively by the user device and the remote server. An example system of FIG. 3B may include user device 130 and server device 170, communicatively connected by network 150. As depicted, most operations outlined in FIG. 3B are identical or similar to those outlined in FIG. 3A. For example, operations 302, 304, 310, 312 and 314 can be the same as those described in connection with FIG. 3A. For example, a user device 130 can perform these operations using modules that are similar to those previously described in connection with user device 110. The most noticeable difference is that operations 306 and 308 are no longer performed locally by a user device, but instead by another device; for example, remote server 170. Additionally, operations 305 and 309 are implemented such that information can be communicated between the user, the user device and the other device via network connection. These operations are carried out, for example, by the user device 130 and remote server 170 via network 150, as illustrated in FIG. 1.

By splitting the processing and analytical tasks between a local user device (e.g., user device 130) and a remote server device (e.g., server device 170), it is possible to carry out the methods by balancing efficiency and speed with certain user concerns such as privacy concerns. For example, according to FIG. 3B, initial processing of input characters can take place on the user device. Here, individualized or personalized information that is unique to the particular user can be applied to create processed input characters and other analytical results. For example, a variant string of an actual input string can be created based on personal typing habits or vocabulary usage. The variant string, along with the actual input string, can then be sent to the remote server for further processing and identification of input errors.

FIG. 3C also illustrates example user-device-server interactions in an example process of intelligently deleting back to a typographical error in a string of input characters. As depicted, most operations outlined in FIG. 3C are identical or similar to those outlined in FIGS. 3A and 3B. For example, operations 302, 310, 312 and 314 can be the same as those described in connection with FIGS. 3A and 3B. For example, a user device 130 can perform these operations using modules that are similar to those previously described in connection with user device 110. The most noticeable difference is that operations 304, 306 and 308 are no longer performed locally by a user device, but instead by another device; for example, remote server 170. Additionally, operations 303 and 309 are implemented such that information can be communicated between the user, the user device and the other device via network connection. These operations are carried out, for example, by the user device 130 and remote server 170 via network 150, as illustrated in FIG. 1. In the embodiment shown in FIG. 3C, most processing and analytical steps take place on the remote server to further enhance efficiency.

Example Data Structure

FIG. 4 depicts an example data tree structure illustrating a character-by-character analytical process for identifying a typographical error in a string of input characters. The analytical process and resulting tree-like data structure are provided as examples by way of illustration and should not in any way limit the scope of the systems and methods disclosed herein.

In this example, the intended word is "California" and the example data tree structure starts with the letter "c." As shown, there are no constrains for the first input character $C_1$, which can be any one of the 26 letters in the English alphabet.

Once a computer device receives a first input character $C_1$ (e.g., via a GUI interface), options for second input character $C_2$ will be affected if the string of $C_1$-$C_2$ should lead to known words in a particular language. For example, "c" is the first input character. To create a word in the English language, the second input character can be either a vowel or a consonant. There are still quite a few options in this example, but certain letters are excluded. For example, the second input character is unlikely to be one of "b, c, d, . . . , p, q, . . . , x, z." In some embodiments, the data structure further includes statistical information associated with each possible combination of letters. For example, words starting with "c-a" occur at a higher frequency than words starting with "c-y" or "c-u." Such information can be helpful when identifying a possible input error or when predicting the word that the user intends to enter. For example, the system can store the word information (including statistical data and contextual information) in a customized English dictionary that is stored in either local database 114 or server database 172, or both. Processing module 116 of user device 110 or processing module 176 of server 170 can access the stored information when processing a string of input characters.

Similarly, once a computer device receives the first and second characters, options for the third character $C_3$ will be affected. Indeed, for each additional character identified, options for subsequent characters will be affected in order to form a word with characters matching those in the string of input characters. Again, based on statistical analysis, a frequency or probability value can be assigned to each combination of letters. As language evolves, such usage information can change with time.

In some embodiments, the computer device (e.g., using an error locator module of either user device 110 or server device 170) can identify deviations from the tree-like map as input errors. For example, there are no words starting with "c-a-l-i-r." The letter "r" is likely an error.

In some embodiments, a word may branch at a point with multiple possible options among which no single option clearly dominates. As such, identifying a single word may become impossible. For example, although the intended word is "California," a user makes two errors and enters "c-a-l-i-b-e-r-n . . . " Here, "f" is mistakenly entered as "b" and "o" is mistakenly entered as "e." Even though the user's subsequent entries match the letter in "California," there may be enough confusion that multiple deletion options may be created to recommend the user to delete all characters following "c-a-l-i" or "c-a-l." In some embodiments, a user can set a confidence level that reflects the number of characters to deleted. If a high confidence level is required for predicting a word, the method may error on the side of caution and create multiple deletion options for deleting more characters, leave fewer characters intact; for example, "c-a" or "c-a-l" versus "c-a-l-i." In some embodiments, a user interface (e.g., a pop-up menu) can present multiple deletion options allowing a user to delete a portion of the input character string such as "l-i-b-e-r-n," "i-b-e-r-n," and "b-e-r-n." For example, a pop-up menu can be triggered by a user gesture input such as any or a combination of: a hard screen press, a long hold, double tapping, or holding down the delete key.

In some embodiments, the computer device can modify a tree-like data structure, either via a processing module or an error locator module) based on persistent personal typing habits. For example, if the user persistently enters "o" instead of "i," the data tree can be modified to convert "c-a-l-o" to "c-a-l-i" for subsequent analysis and assign "c-a-l-o" a lower probability value to correct the user bias. In some embodiments, the deletion options corresponding to "c-a-l-o" and "c-a-l-i" are ranked (e.g., in a list or in a pop-up menu) based on the probability value associated with each word.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers smart phones, and wearable devices (e.g., smart watch, smart glasses, etc.). One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 5:
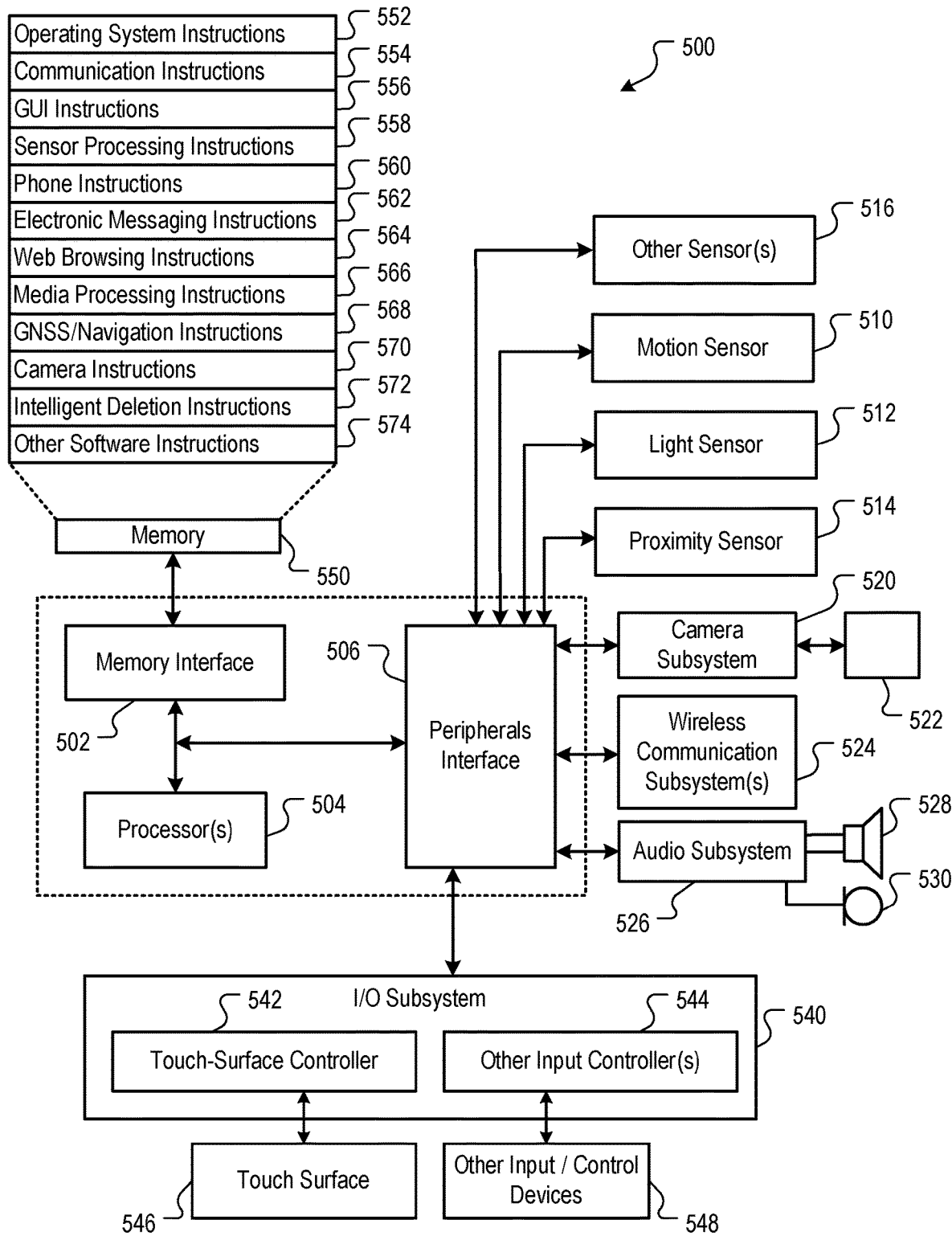
FIG. 5 is a block diagram of an example system architecture implementing the features and processes of FIGS. 1-4.

FIG. 5 is a block diagram of an example system architecture implementing the features and processes of FIGS. 1-4. An example computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GPS receiver), a temperature sensor, a biometric sensor, magnetometer or other sensing device, to facilitate related functionalities.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM network, a GPRS network, an EDGE network, a Wi-Fi or WiMax network, and a Bluetooth™ network. In particular, the wireless communication subsystems 524 can include hosting protocols such that the device 100 can be configured as a base station for other wireless devices.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voice-printing and voice authentication, for example.

The I/O subsystem 540 can include a touch-surface controller 542 and/or other input controller(s) 544. The touch-surface controller 542 can be coupled to a touch surface 546. The touch surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch surface 546; and a pressing of the button for a second duration that is longer than the first duration can turn power to the computing device 500 on or off. Pressing the button for a third duration can activate a voice control, or voice command, module that enables the user to speak commands into the microphone 530 to cause the device to execute the spoken command. The user can customize a functionality of one or more of the buttons. The touch surface 546 can, for example, also be used to implement virtual or soft buttons and/or a keyboard.

In some implementations, the computing device 500 can present recorded audio and/or video files, such as MP3, AAC, and MPEG files. In some implementations, the computing device 500 can include the functionality of an MP3 player, such as an iPod™. The computing device 500 can, therefore, include a 36-pin connector that is compatible with the iPod. Other input/output and control devices can also be used.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication. For example, operating system 552 can implement the intelligent deletion features as described with reference to FIGS. 1-4.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions.

The memory 550 can store software instructions 572 to facilitate other processes and functions, such as the input error identification and deletion methods and systems as described with reference to FIGS. 1-4.

The memory 550 can also store other software instructions 574, such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

I claim:

1. A method, comprising:
presenting, via a display of a computing device, a first character;
receiving, via one or more input devices of the computing device, first user input corresponding to a first key of a keyboard of the computing device, wherein the first key corresponds to a second character;
in response to the first user input, presenting, via the display of the computing device, a first sequence of characters including the first character and the second character, wherein the second character is added after the first character such that the first character and the second character are concurrently presented via the display;
receiving, via the one or more input devices, second user input corresponding to a second key of the keyboard, wherein the second key corresponds to a third character;
in response to the second user input, presenting, via the display of the computing device, a second sequence of characters including the first character, the second character, and the third character, wherein the third character is added after the second character such that the first character, the second character, and the third character are concurrently presented via the display;
determining, by the computing device, that a particular character in the second sequence of characters corresponds to a typographical error;
after concurrently presenting the first character, the second character, and the third character:
receiving, by the computing device, third user input corresponding to a third key of the keyboard, wherein the third key corresponds to a delete operation; and
in response to the third user input:
in accordance with a determination that a first set of one or more criteria are met, only deleting, by the computing device, the third character such that the first character and the second character are still concurrently presented via the display and the third character is not still presented via the display, wherein the first set of one or more criteria include a criterion that is met when the third character is the typographical error; and
in accordance with a determination that a second set of one or more criteria are met, only deleting, by the computing device, the second character and the third character such that the first character is still presented via the display and the second character and the third character are not still presented via the display, wherein the second set of one or more criteria include a criterion that is met when the second character is the typographical error,
wherein no character is added in response to the third user input.

2. The method of claim 1, wherein the second character is a letter from an alphabet, an abjad, an impure abjad, an abugida, a syllabary, a semi-syllabary, a logogram, a logophonetic entry, a shorthand writing symbol, a number, or a punctuation mark.

3. The method of claim 1, wherein:
the determination that the first set of one or more criteria are met includes a determination that (1) a combination of the first character and the second character matches at least a portion of a first known word, and (2) a combination of the first character, the second character, and the third character does not match at least a portion of the first known word; and
the determination that the second set of one or more criteria are met includes a determination that (1) the first character matches at least a portion of a second known word, and (2) a combination of the first character and the second character do not match at least a portion of the second known word.

4. The method of claim 1, wherein:
the criterion of the first set of one or more criteria is met when a first probability is below a threshold,
the first probability is a likelihood that a first word is before or after a second word,
the second word is different from the first word, the first word includes the first character, the second character, and the third character, the criterion of the second set of one or more criteria is met when a second probability is below a threshold, the second probability is a likelihood that a third word is before or after a fourth word, the third word is different from the fourth word, and the third word includes the first character and the second character.

5. The method of claim 1, further comprising:
after concurrently presenting the first character, the second character, and the third character:
before detecting the third user input:
in accordance with the determination that the first set of one or more criteria are met, presenting an indication that the third character is a typographical error and not displaying any indication that the second character is a typographical error; and
in accordance with the determination that the second set of one or more criteria are met, displaying an indication that the second character is a typographical error and not displaying any indication that the first character is a typographical error.

6. The method of claim 1, wherein the second input is detected via a physical keyboard, a virtual keyboard, or a microphone.

7. The method of claim 1, wherein a single word, without spaces, includes the first character, the second character, and the third character.

8. The method of claim 1, further comprising:
determining whether the second character is a typographical error by comparing, at the computing device, a set of characters comprising the first character and the second character, to a known word in a dictionary.

9. The method of claim 1, wherein the first user input corresponding to the first key of the keyboard is detected while text input is positioned at a location after the first character, wherein the second user input corresponding to the second key of the keyboard is detected while text input is positioned at a location after the second character, and wherein the third user input corresponding to the third key of the keyboard is detected while text input is positioned at a location after the third character.

10. A non-transitory computer-readable medium including one or more sequences of instructions that, when executed by one or more processors, cause the processors to perform operations comprising:
presenting, via a display of a computing device, a first character;
receiving, via one or more input devices of the computing device, first user input corresponding to a first key of a keyboard of the computing device, wherein the first key corresponds to a second character;
in response to the first user input, presenting, via the display of the computing device, a first sequence of characters including the first character and the second character, wherein the second character is added after the first character such that the first character and the second character are concurrently presented via the display;
receiving, via the one or more input devices, second user input corresponding to a second key of the keyboard, wherein the second key corresponds to a third character;
in response to the second user input, presenting, via the display of the computing device, a second sequence of characters including the first character, the second character, and the third character, wherein the third character is added after the second character such that the first character, the second character, and the third character are concurrently presented via the display;
determining, by the computing device, that a particular character in the second sequence of characters corresponds to a typographical error;
after concurrently presenting the first character, the second character, and the third character:
receiving, by the computing device, third user input corresponding to a third key of the keyboard, wherein the third key corresponds to a delete operation; and
in response to the third user input:
in accordance with a determination that a first set of one or more criteria are met, only deleting, by the computing device, the third character such that the first character and the second character are still concurrently presented via the display and the third character is not still presented via the display, wherein the first set of one or more criteria include a criterion that is met when the third character is the typographical error; and
in accordance with a determination that a second set of one or more criteria are met, only deleting, by the computing device, the second character and the third character such that the first character is still presented via the display and the second character and the third character are not still presented via the display, wherein the second set of one or more criteria include a criterion that is met when the second character is the typographical error,
wherein no character is added in response to the third user input.

11. The non-transitory computer-readable medium of claim 10, wherein the second character is a letter from an alphabet, an abjad, an impure abjad, an abugida, a syllabary, a semi-syllabary, a logogram, a logophonetic entry, a shorthand writing symbol, a number, or a punctuation mark.

12. The non-transitory computer-readable medium of claim 10, wherein:
the determination that the first set of one or more criteria are met includes a determination that (1) a combination of the first character and the second character matches at least a portion of a first known word, and (2) a combination of the first character, the second character, and the third character does not match at least a portion of the first known word; and
the determination that the second set of one or more criteria are met includes a determination that (1) the first character matches at least a portion of a second known word, and (2) a combination of the first character and the second character do not match at least a portion of the second known word.

13. The non-transitory computer-readable medium of claim 10, wherein:
the criterion of the first set of one or more criteria is met when a first probability is below a threshold,
the first probability is a likelihood that a first word is before or after a second word,
the second word is different from the first word,
the first word includes the first character, the second character, and the third character,
the criterion of the second set of one or more criteria is met when a second probability is below a threshold, the second probability is a likelihood that a third word is before or after a fourth word, the third word is different from the fourth word, and the third word includes the first character and the second character.

14. The non-transitory computer-readable medium of claim 10, wherein the operations further comprise:

after concurrently presenting the first character, the second character, and the third character:
before detecting the third user input:
in accordance with the determination that the first set of one or more criteria are met, presenting an indication that the third character is a typographical error and not displaying any indication that the second character is a typographical error; and
in accordance with the determination that the second set of one or more criteria are met, displaying an indication that the second character is a typographical error and not displaying any indication that the first character is a typographical error.

15. A computer system comprising:

one or more processors; and a non-transitory computer-readable medium including one or more sequences of instructions that, when executed by one or more processors, cause the processors to perform operations comprising:
presenting, via a display of the computer system, a first character;
receiving, via one or more input devices of the computer system, first user input corresponding to a first key of a keyboard of the computer system, wherein the first key corresponds to a second character;
in response to the first user input, presenting, via the display of the computer system, a first sequence of characters including the first character and the second character, wherein the second character is added after the first character such that the first character and the second character are concurrently presented via the display;
receiving, via the one or more input devices, second user input corresponding to a second key of the keyboard, wherein the second key corresponds to a third character;
in response to the second user input, presenting, via the display of the computer system, a second sequence of characters including the first character, the second character, and the third character, wherein the third character is added after the second character such that the first character, the second character, and the third character are concurrently presented via the display;
determining, by the computer system, that a particular character in the second sequence of characters corresponds to a typographical error;
after concurrently presenting the first character, the second character, and the third character:
receiving, by the computer system, third user input corresponding to a third key of the keyboard, wherein the third key corresponds to a delete operation; and
in response to the third user input:
in accordance with a determination that a first set of one or more criteria are met, only deleting, by the computer system, the third character such that the first character and the second character are still concurrently presented via the display and the third character is not still presented via the display, wherein the first set of one or more criteria include a criterion that is met when the third character is the typographical error; and
in accordance with a determination that a second set of one or more criteria are met, only deleting, by the computer system, the second character and the third character such that the first character is still presented via the display and the second character and the third character are not still presented via the display, wherein the second set of one or more criteria include a criterion that is met when the second character is the typographical error,
wherein no character is added in response to the third user input.

16. The computer system of claim 15, wherein the second character is a letter from an alphabet, an abjad, an impure abjad, an abugida, a syllabary, a semi-syllabary, a logogram, a logophonetic entry, a shorthand writing symbol, a number, or a punctuation mark.

17. The computer system of claim 15, wherein:

the determination that the first set of one or more criteria are met includes a determination that (1) a combination of the first character and the second character matches at least a portion of a first known word, and (2) a combination of the first character, the second character, and the third character does not match at least a portion of the first known word; and the determination that the second set of one or more criteria are met includes a determination that (1) the first character matches at least a portion of a second known word, and (2) a combination of the first character and the second character do not match at least a portion of the second known word.

18. The computer system of claim 15, wherein:

the criterion of the first set of one or more criteria is met when a first probability is below a threshold,
the first probability is a likelihood that a first word is before or after a second word,
the second word is different from the first word,
the first word includes the first character, the second character, and the third character,
the criterion of the second set of one or more criteria is met when a second probability is below a threshold,
the second probability is a likelihood that a third word is before or after a fourth word,
the third word is different from the fourth word, and
the third word includes the first character and the second character.

19. The computer system of claim 15, wherein the operations further comprise:

after concurrently presenting the first character, the second character, and the third character:
before detecting the third user input:
in accordance with the determination that the first set of one or more criteria are met, presenting an indication that the third character is a typographical error and not displaying any indication that the second character is a typographical error; and
in accordance with the determination that the second set of one or more criteria are met, displaying an indication that the second character is a typographical error and not displaying any indication that the first character is a typographical error.

* * * * *